Patented Dec. 2, 1952

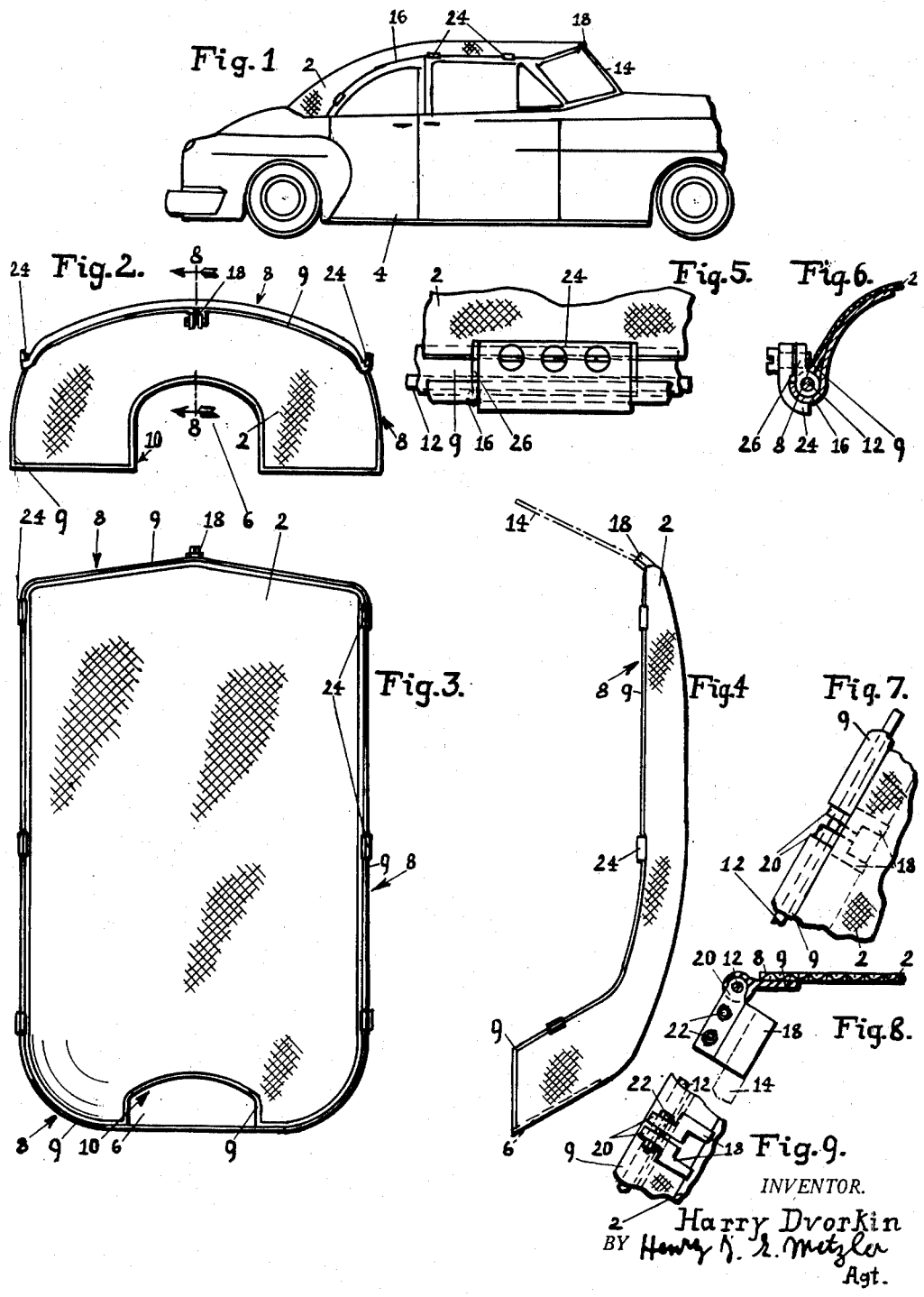

2,619,919

UNITED STATES PATENT OFFICE 2,619,919

REMOVABLE TOP FOR SOLID TOP AUTOMOBILES

Harry Dvorkin, Brooklyn, N. Y.

Application March 21, 1950, Serial No. 150,942

3 Claims. (Cl. 108—3)

The present invention relates to improvements in tops for automobiles and similar vehicles, which are provided with solid tops of sheet metal, wood or of transparent or opaque plastic material.

It is well-known that some automobiles which have a solid top are provided at the outer side of the top with a layer of cloth, which is cemented or otherwise permanently secured thereto in order to give the car the appearance of a convertible. Such a layer of cloth is difficult to clean, or to mend if it has been damaged. Therefore, one object of the present invention is the provision of a device of the character described which can be detachably secured to the top of any solid-top car so as to give the car the appearance of a convertible and which can be removed therefrom at any time, for instance at the termination of each warmer season when convertibles no longer are in style, or if a person travels from warmer parts of the country to cooler regions. Such a removable top will preserve the paint of the roof, will reduce the work and effort of "simonizing" a car, and it will afford the protection of a steel roof although it gives the car the appearance of a convertible.

Another object of the present invention is the provision of a device of the character described which can be removed from, and attached to, a car top easily and quickly and without the application of any considerable amount of skill, as well as without scratching or otherwise impairing the paint of the car, and which does not require any structural alternations on the car itself.

Still another object of the present invention is the provision of a device of the character described which is light in weight, foldable so that it requires only very little space for storing it when not in use, or can be used as a kit, and is inexpensive to manufacture, but which is also durable, sturdy, and well adapted for the purpose for which it is intended.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing a preferred form of the invention has been shown.

In said drawing:

Figure 1 is a diagrammatic side view of an automobile with an embodiment of this invention attached thereto;

Figure 2 is a front elevation of a preferred embodiment of my invention;

Figure 3 is a bottom plan view of the same;

Figure 4 is a side elevation view of the same;

Figure 5 is an enlarged detail side view of a lateral clamp arrangement;

Figure 6 is an enlarged detail front view of a lateral clamp arrangement;

Figure 7 is an enlarged detail top view of a front clamp arrangement;

Figure 8 is an enlarged sectional fractional view on the line 8—8 of Figure 2; and Figure 9 is an enlarged fractional bottom view of the front clamp arrangement.

Similar reference characters refer to similar parts throughout the several views.

In the drawing the numeral 2 denotes a sheet of cloth, plastic material, elastic fabric, nylon, or of any other elasticized material, or the like adapted for covering the entire top of an automobile 4 (Figure 1). The sheet 2 preferably is provided in its rear section with an aperture 6 which registers with the rear window of the automobile. The edge portions 8 of the sheet 2 and the sheet portions 10 adjacent the aperture 6 are provided with a piping 9 following the outline of the sheet 2 and of the car top. Through said piping 9 are extended thin metal members 12 or the like in order to stiffen said edge portions. Said metal members preferably are cables in the side edge pipings and stiff rods or tubes or the like in the pipings on the front edges 8 and the rear portions 10. The sheet 2 is detachably secured to the windshield center post 14 and to the rain gutter flanges 16 or to any other suitable parts of the automobile by any suitable clamping means. I prefer to carry out this feature of my invention in the manner shown in the drawing, where it will be seen that a pair of jaw members 18 have lug portions 20 (Figures 7 and 8) through which extends a portion of a member 12 and are clamped by means of screws 22 upon the windshield center post 14, while the rain gutters 16 of the automobile are engaged by curved members 24 (Figures 5 and 6) that are screwed upon members 26 through which the members 12 are extended.

The rear portions of the sheet 2 can be provided with ornamentations (not shown) forming braces or the like, or braces may be provided at the lower inner sides of the lateral rim portions if this should be necessary for stiffening or for securing said portions to the automobile. Said braces or the like follow the outline of the rear portion of the automobile body. Those portions of the members 12 which are made as cables I prefer to provide with any suitable expandable sections, in order to adjust the proper tension of these cables so that the device will be tight all around the car top. The device can be collapsed to a small package, when it is not in use, or while it is shipped, stored and on sale.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent in the United States is:

1. A removable top for solid top automobiles having a windshield center post and having rain gutters along the marginal edges of the roof thereof, comprising a body portion of elastic material, piping along the marginal edges of said body portion, cables including expandable sections extending through said piping along the side edges of said body member, stiffener members extending through said piping along the front and rear edges of said body member and clamping means secured to said stiffener member extending through the front edge of said body member, said clamping means being adapted to engage the center post of said automobile windshield, and further means along said side edges including a plurality of clamp members, said clamp members being adapted to engage the rain gutters along the marginal edges of the roof of the automobile.

2. A removable top for solid top automobiles having a windshield center post, rain gutters along the marginal side edges of the roof thereof and a rear window, comprising a body portion of elastic material, piping along the marginal edges of said body portion, cables including expandable sections extending through said piping along the side edges of said body member, stiffener members extending through said piping along the front and rear edges of said body member, a pair of jaws secured to said stiffener member extending through the front edge of said body member, said jaws being adapted to engage the windshield center post, and means along said side edges including a plurality of clamp members, said clamp members being adapted to engage the rain gutters along the marginal edges of the roof of the automobile.

3. A removable top for solid top automobiles having rain gutters along the marginal side edges of the roof thereof, comprising a body portion of elastic material, piping along the marginal side edges of said body portion, cables including expandable sections extending through said piping along the side edges of said body member, piping along the rear marginal edge of said body member, a stiffener member extending through said piping along the rear marginal edge of said body member, and means at the front extremity of said body member for securing said front edge of said body portion to the roof of said automobile.

HARRY DVORKIN.

REFERENCES CITED

The following references are of record in the file of this patent:

UNITED STATES PATENTS

| Number | Name | Date |
|---|---|---|
| 1,613,270 | Glover | Jan. 4, 1927 |
| 2,231,293 | Norman | Feb. 11, 1941 |
| 2,334,856 | Atkinson | Nov. 23, 1943 |
| 2,418,918 | Yankus | Apr. 15, 1947 |
| 2,479,825 | Fleischhauer | Aug. 23, 1949 |